(12) United States Patent
Maigler

(10) Patent No.: US 8,706,368 B2
(45) Date of Patent: Apr. 22, 2014

(54) SECONDARY DRIVE DEVICE OF A MOBILE WORKING APPLIANCE

(75) Inventor: Achim Maigler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 468 days.

(21) Appl. No.: 13/034,405

(22) Filed: Feb. 24, 2011

(65) Prior Publication Data
US 2011/0213534 A1    Sep. 1, 2011

(30) Foreign Application Priority Data

Feb. 27, 2010  (DE) .......................... 10 2010 009 655

(51) Int. Cl.
*F16H 59/50* (2006.01)
*G06F 17/00* (2006.01)
*G06F 19/00* (2011.01)
*G06F 11/30* (2006.01)

(52) U.S. Cl.
USPC ...................... 701/58; 701/67; 701/68; 74/11

(58) Field of Classification Search
USPC .......... 701/1, 36, 48, 49, 50, 51, 29.1, 52, 53, 701/55, 58, 66, 67; 74/11, 15.2, 15.66, 74/15.69
See application file for complete search history.

(56) References Cited

U.S. PATENT DOCUMENTS

| 4,244,232 | A | * | 1/1981 | Murayama | 74/15.66 |
| 4,492,292 | A | * | 1/1985 | Thor | 192/69.91 |
| 4,498,349 | A | * | 2/1985 | Nishihara | 74/15.2 |
| 4,610,174 | A | * | 9/1986 | Takagi et al. | 74/15.2 |
| 2010/0036569 | A1 | * | 2/2010 | Hel et al. | 701/50 |
| 2011/0275470 | A1 | * | 11/2011 | Ekonen et al. | 475/198 |

FOREIGN PATENT DOCUMENTS

DE       28 13 991 C2    1/1985

* cited by examiner

*Primary Examiner* — Thomas Tarcza
*Assistant Examiner* — Edward Pipala
(74) *Attorney, Agent, or Firm* — Maginot, Moore & Beck

(57) ABSTRACT

A secondary drive device of a mobile working appliance with an electronic control unit for actuating a power take-off shaft clutch arranged between a transmission and a power take-off shaft is disclosed. According to the disclosure, the control unit is designed with a flange-mounting function unit which, when activated, executes a rotary position correction of the power take-off shaft with respect to the drive shaft. Furthermore, a method for coupling and/or uncoupling a working machine to/from the secondary drive device of a mobile working appliance as an energy source is proposed. The method includes the steps of leading a drive shaft of the working machine up to the end spline shaft profile of a power take-off shaft of the secondary drive device, checking the relative rotary position of the power take-off shaft with respect to the drive shaft of the working machine, and selectively triggering a flange-mounting function of the secondary drive device as a function of the result of the check of the relative position for the electronically controlled rotary position correction of the power take-off shaft with respect to the drive shaft.

16 Claims, 2 Drawing Sheets

SECONDARY DRIVE DEVICE OF A MOBILE WORKING APPLIANCE

This application claims priority under 35 U.S.C. §119 to German patent application No. 10 2010 009 655.5, filed Feb. 27, 2010 in Germany, the disclosure of which is incorporated herein by reference in its entirety.

BACKGROUND

The present disclosure relates to a secondary drive device of a mobile working appliance, such as, for example, a tractor for the connection of working machines, and to a method for coupling and/or uncoupling a working machine to/from the secondary drive device.

Mobile working appliances, such as tractors, but also heavy goods vehicles with additional functions (additional assemblies), such as winches, cranes and such like machines, are usually equipped with a secondary drive, via which the secondary assembly can be connected to the engine (internal combustion engine) of the mobile working appliance as an energy source. Such a secondary drive has what is known as a power take-off shaft, the free end of which is mostly designed with a spline shaft profile for transferring a torque and which either is designed in a separate drive shaft of the engine (engine power take-off shaft which is connected directly to the engine and runs correspondingly to the engine rotational speed) and constitutes an output shaft connectable via a clutch to the transmission of the mobile working appliance (transmission power take-off shaft which is connected to the engine via the clutch and transmission and can be operated with different nominal rotational speeds) or is provided as a connecting shaft connected to the driving axle of the mobile working appliance (directional power take-off shaft which is coupled by means of toothing to the drivetrain of the wheels, so that the rotational speed rises with an increase in driving speed).

In practice, transmission power take-off shafts, that is to say those power take-off shafts which are selectively connectable to the transmission of the working appliance via a clutch, have proved acceptable, since these can be selectively activated/deactivated via the clutch and moreover, in contrast to the power take-off shafts connected to the driving axle, can generate torque independently of the propulsion speed of the working appliance.

A secondary drive device of the transmission power take-off shaft type is known from the prior art, for example according to DE 28 13 991 C2. Accordingly, a tractor as a mobile working appliance is equipped with an engine transmission, to which a secondary drive shaft can be coupled, to which, in turn, an additional assembly, for example for agricultural use, can be connected. For this purpose, a clutch is provided, which, in the engaged state, can transfer a nominal torque to the power take-off shaft. The operative connection between the clutch and transmission is configured such that two different rotational speeds can selectively be picked off from the transmission. To actuate the clutch, a hydraulic system is provided, which can be activated via an electric/electronic control unit and is fluid-connected to the clutch, so that the clutch is engaged and disengaged by a driver as a function of an actuating signal.

It has been shown that, in secondary drive devices in general and particularly of the transmission power take-off shaft type, a problem arises when the additional assembly is coupled and uncoupled to/from the power take-off shaft, in that the spline shaft profile of the power take-off shaft is randomly in a rotary position in which it is not possible to plug on or plug in an input shaft of the additional assembly, for example when the teeth of the two shafts are aligned with one another (that is to say, when the teeth of the power take-off shaft impinge on the teeth of the drive shaft of the additional assembly). This situation also often arises when the additional assembly is uncoupled, the spline shaft profile or spline shaft connection is under (torque) load, as before, and therefore the two shafts are braced with respect to one another such that it becomes impossible to separate the two shafts.

Even when the clutch is disengaged, manual rotation of the power take-off shaft, even with the aid of more or less suitable tools, is often possible only with difficulty or not at all, since the resistance of the power take-off shaft mounting is too great. The same also applies, as a rule, to the additional assembly. The correct rotary position of the power take-off shaft with respect to the input shaft of an additional assembly can therefore sometimes be achieved only with difficulty (randomly) or after a great amount of time has been expended.

Basically, there is always the possibility of setting the power take-off shaft in (dummy) rotation by engaging the clutch and consequently influencing the rotary position at renewed standstill. However, the final rotary position of the power take-off shaft resulting from this at renewed standstill is essentially random, since, for safety reasons, when an activating switch of the control unit is actuated in order to put the power take-off shaft into operation, engagement of the clutch is triggered only with a predetermined time delay (usually 2 sec), and also the disengagement of the clutch does not take place with such accuracy that the final rotary position of the power take-off shaft can be predetermined.

In view of this problem, an object of the present disclosure is to provide a secondary drive device of the transmission power take-off shaft type, which has higher functionality. One aim of the disclosure is in this case, in particular, to improve the convenient handling of the secondary drive device during coupling and/or uncoupling of an additional assembly.

SUMMARY

This object is achieved, according to the disclosure, by means of a secondary drive device possessing the features set forth herein, and a method for coupling and/or uncoupling an additional assembly having the features set forth herein. Advantageous refinements of the disclosure are also set forth herein.

The essence of the disclosure is therefore to equip the secondary drive device of a mobile working appliance with an electronic control unit for actuating a power take-off shaft clutch arranged between a transmission and a power take-off shaft, which control unit is designed with a flange-mounting function unit which, when correspondingly activated (preferably manually by the driver), executes a rotary position correction of the power take-off shaft with respect to the drive shaft. That is to say, with the actuation of the flange-mounting function, the power take-off shaft executes a rotational movement which is independent of normal operation and, where appropriate, is also different, a result of which is that the spline shaft profile or multi-groove profile of the power take-off shaft is rotated by the amount of a few degrees (rotary step with defined step width). The power take-off shaft can thus be adapted to the rotary position of the input shaft of the additional assembly and the coupling/uncoupling operation can be carried out in a simple way.

According to one aspect of the disclosure, the rotary position correction causes minimal rotation of the power take-off shaft with a torque greatly restricted with respect to the nominal torque of the secondary drive device. That is to say, particularly when an uncoupling operation is to be triggered, the rotational movement of the power take-off shaft does not lead to a bracing of the spline shaft connection again. In this case, it should be pointed out that, in the case of rotary position correction, the direction of rotation of the power take-off shaft is preferably opposite to the direction of rotation of the power take-off shaft during normal operation.

In a further aspect of the disclosure, the rotary position correction provides rotation of the power take-off shaft smaller by the amount of one angle of rotation than the division of a spline shaft profile formed on the power take-off shaft. This ensures that the two spline shaft profiles lying opposite one another are aligned such that their teeth come to lie offset with respect to one another and therefore coupling becomes possible.

In order to simplify the triggering of the rotary position correction, there is preferably provision for arranging an external actuating switch for activating the flange-mounting function unit. Alternatively, however, there may also be provision for equipping the control with a single switching element (switch) and for causing the rotary position correction to be triggered as a function of the actuating time of the switch. That is to say, for example, short actuation means rotary position correction and long actuation means normal operation.

According to another aspect of the disclosure, a method for coupling and/or uncoupling a working machine to/from the secondary drive device of a mobile working appliance as an energy source is proposed, with the method steps:

leading a drive shaft of the working machine up to the end spline shaft profile of a power take-off shaft of the secondary drive device, checking the relative rotary position of the power take-off shaft with respect to the drive shaft of the working machine, and selectively triggering a flange-mounting function of the secondary drive device as a function of the result of the check of the relative position for the electronically controlled rotary position correction of the power take-off shaft with respect to the drive shaft.

As a result, on the one hand, the coupling/uncoupling of an additional assembly to/from the power take-off shaft is simplified and, on the other hand, an additional tool is no longer required for this activity.

The disclosed device and method are explained in more detail below by means of a preferred exemplary embodiment, with reference to the accompanying figures.

DETAILED DESCRIPTION

Figure 1:
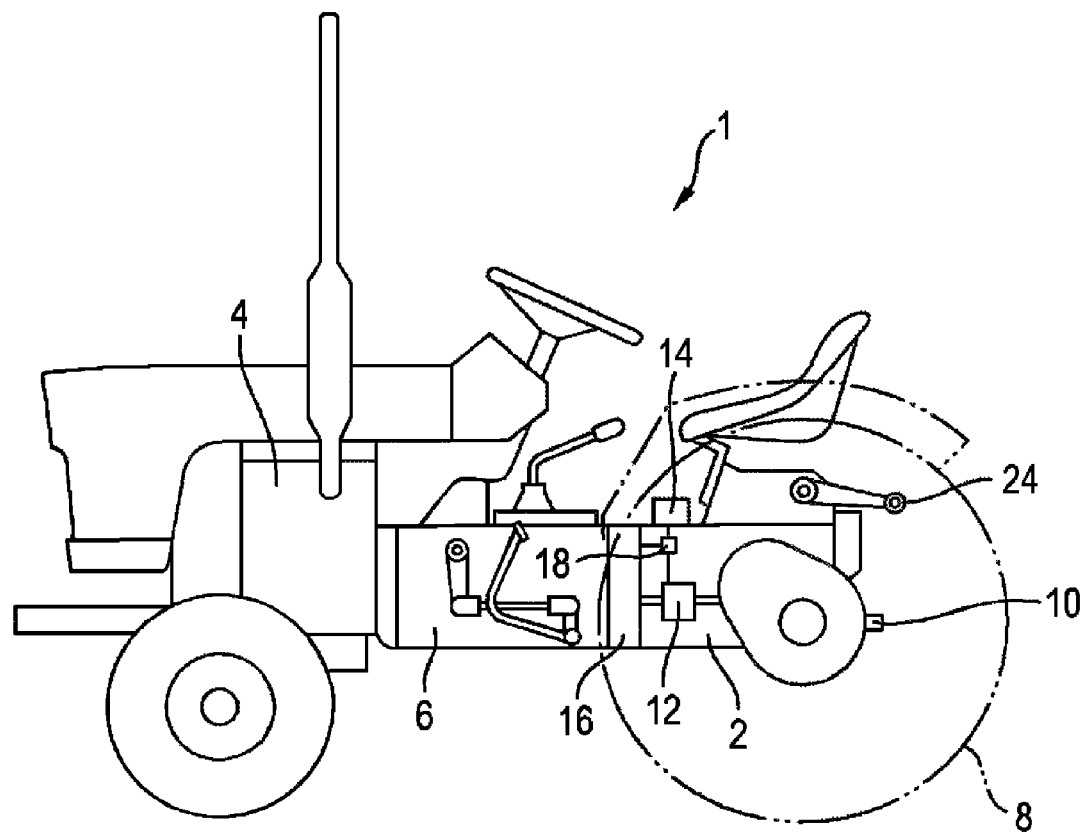
FIG. 1 is a basic illustration of a mobile working appliance, for example in the form of a tractor, which is equipped with a secondary drive device according to the disclosure in a preferred exemplary embodiment of the disclosure.

FIG. 1 shows a mobile working appliance 1, for example in the form of a tractor or such like agricultural vehicles, which is equipped with a secondary drive device 2 according to a preferred exemplary embodiment of the disclosure.

The mobile working appliance 1 consequently has an engine 4 and a transmission 6 which are connected to one another to form a mounting frame of the working appliance. The drive of the working appliance 1 takes place via rear wheels 8 which are connected to the transmission 6 of the mobile working appliance 1 by means of a drivetrain (not illustrated in any more detail).

A secondary drive shaft 10 serves for driving one or more additional assemblies. For this purpose, the secondary drive shaft 10 or power take-off shaft is connected to the transmission 6 of the mobile working appliance 1 via a clutch 12 illustrated merely diagrammatically. In the present exemplary embodiment, too, the power take-off shaft 10 has two possibilities for engagement on the transmission 6 in such a way that the power take-off shaft 10 can be selectively operated with two different rotational speeds.

An electrical/electronic control unit 14 illustrated diagrammatically is connected to a hydraulic system 16, via which, inter alia, the power take-off shaft clutch 12 is engaged and disengaged.

Figure 2:
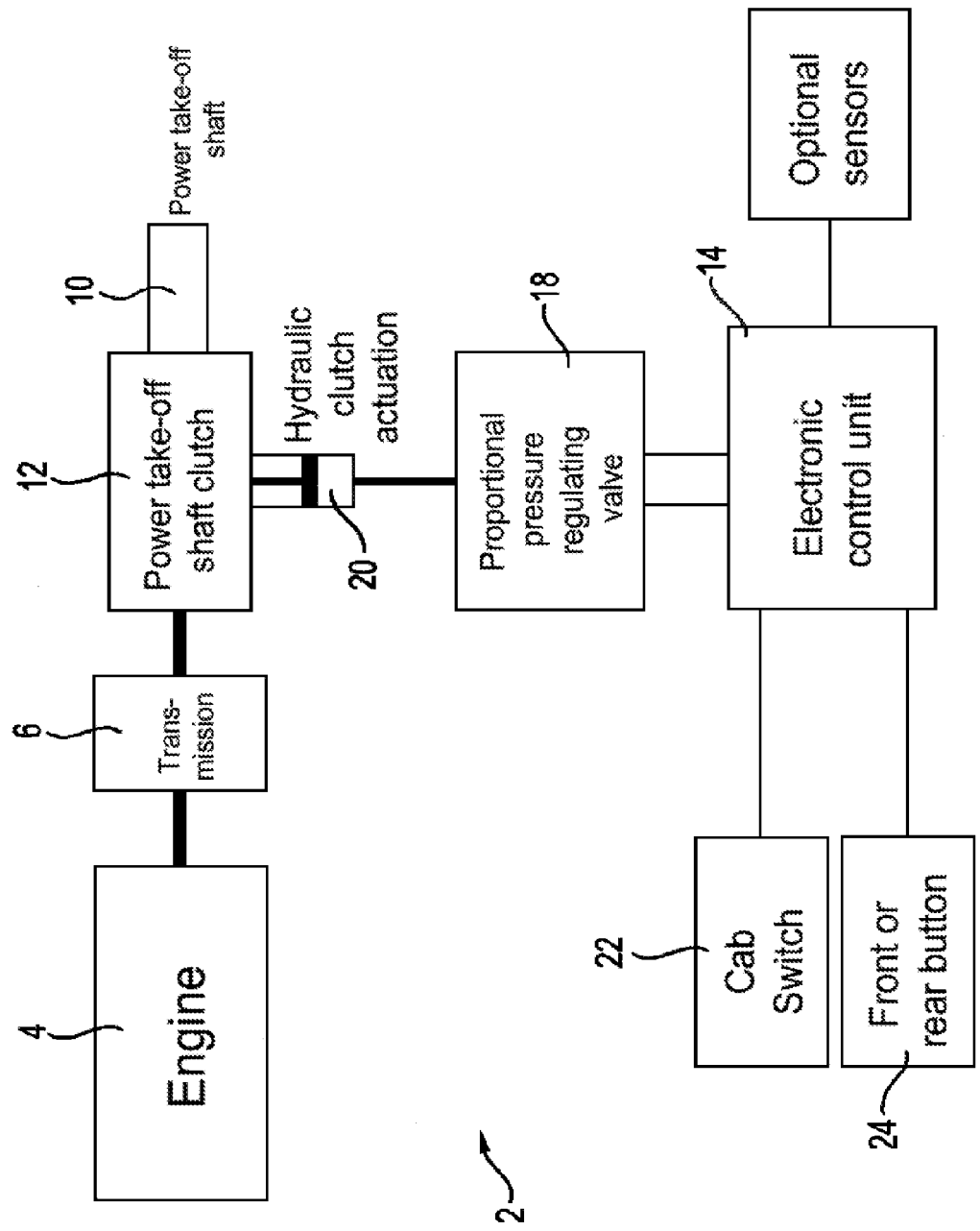
FIG. 2 is a system diagram of the actuating device of a clutch for coupling/uncoupling a transmission power take-off shaft of the secondary drive device according to the disclosure to/from a transmission of the mobile working appliance.

The diagrammatic set-up of the secondary drive device 2 according to the preferred exemplary embodiment of the disclosure is illustrated in FIG. 2.

As can be gathered from FIG. 2, the hydraulic system 16 has, inter alia, a proportional pressure regulating valve 18 which can fluid-connect a pressure medium source (not illustrated in any more detail) to a hydraulic clutch actuation device 20 preferably in the form of a hydraulic cylinder. Depending on the switching position of the preferably electromagnetically actuable proportional pressure regulating valve 18, the hydraulic clutch actuation 20 is consequently acted upon with a hydraulic fluid in order to engage the power take-off shaft clutch 12, or the hydraulic clutch actuation 20 (hydraulic cylinder) is connected to a pressure medium tank fluid, likewise not illustrated, in order to cause disengagement of the power take-off shaft clutch 12.

The electronic control unit 14 is connected via electrical lines to the electromagnetically actuable proportional pressure regulating valve 18 in order to actuate the latter in response to switching signals which are input in the electronic control unit 14 by a driver of the mobile working appliance 1 via corresponding switches.

For this purpose, the electronic control unit 14 has provided on it, inter alia, a cab switch 22, upon the actuation of which an operating signal is output to the electronic control unit 14, which via the proportional pressure regulating valve 18 triggers engagement of the power take-off shaft clutch 12 for commencing normal operation of the secondary drive device 2. In this case, the power take-off shaft clutch 12 connects the power take-off shaft 10 to the transmission 6 of the mobile working appliance 1 in order to transfer a nominal torque for normal operation from the transmission 6 to the power take-off shaft 10.

When the cab switch 22 is actuated again, the electronic control unit 14 receives an inoperative signal, whereupon the electronic control unit 14 activates the electromagnetic proportional pressure regulating valve 18 in such a way that the latter triggers disengagement of the power take-off shaft clutch 12, with the result that the power take-off shaft 10 is separated from the transmission 6.

At renewed standstill of the power take-off shaft 10 after disengagement of the power take-off shaft clutch 12, the latter assumes an essentially random rotary position. If an additional assembly in the form of a preferably agricultural working machine is consequently to be coupled to the power take-off shaft 10, the relatively common situation may arise where the teeth of the spline shaft profile on the power take-off shaft 10 impinge exactly or partially on the teeth of a drive shaft of the additional assembly, so that it becomes impossible to couple the drive assembly in this state. Since manual rotation of the power take-off shaft 10 and/or of the drive shaft of the additional assembly is usually not possible or possible only with difficulty (mostly with the aid of an additional tool), the coupling operation usually involves greater power and is time-intensive.

In order to avoid this problem, an additional front or rear button 24 is connected electrically to the electronic control unit 14 according to FIG. 2. This front or rear button 24 is arranged (electrically) parallel to the cab switch 22 and is actuated when an above-described state, that is to say a rotary position of the power take-off shaft with respect to the drive shaft of the additional assembly which prevents simple coupling of the drive assembly, is detected.

In this case, the front or rear button 24 can preferably be actuated manually, whereupon the electronic control unit 14 receives a rotary position correction signal from the front or rear button 24. This rotary position correction signal activates within the electronic control unit 14 a flange-mounting function unit which, in response to this, executes a rotary position correction of the power take-off shaft 10 with respect to the drive shaft of the additional assembly.

In this case, the electromagnetic proportional pressure regulating valve 18 is activated by the electronic control unit 14 such that the power take-off shaft clutch 12 is actuated only for a short time span and preferably only with a predetermined engagement force which allows only a transfer of torque from the transmission 6 to the power take-off shaft 10 below the nominal torque for the normal operation of the power take-off shaft. In other words, in the case of rotary position correction, the power take-off shaft clutch 12 is engaged by means of the flange-mounting function unit of the electronic control unit 14 for a (short) time span such as to cause a rotation of the power take-off shaft 10 by a few degrees. Preferably, in this case, the power take-off shaft 10 is moved forwards (backward) by the amount of an angle of rotation which is smaller than the circumferential spacing of two teeth of the spline shaft profile formed on the power take-off shaft 10 (smaller than the division of the spline shaft profile formed on the power take-off shaft 10). As a result, whenever the front or rear button 24 is actuated, the power take-off shaft 10 is consequently rotated abruptly by a few degrees until the spline shaft profile of the power take-off shaft 10 is oriented with respect to the spline shaft profile of the input shaft of the additional assembly such that simple coupling of the additional assembly to the power take-off shaft 10 becomes possible.

So that the flange-mounting function unit can be used even when, for example during the uncoupling operation of the additional assembly from the power take-off shaft 10, bracing of the spline shaft connection is detected, which prevents the input shaft of the access assembly from being drawn off from the power take-off shaft 10 in a simple way, when the rotary position correction is triggered by the flange-mounting function unit of the electromagnetic proportional pressure regulating valve 18 is actuated such that the engagement force of the power take-off shaft clutch 12 is markedly lower than the engagement force for normal operation of the secondary drive device 2. In other words, in the case of rotary position correction, the power take-off shaft clutch 12 is actuated such that a markedly lower torque can be transferred from the transmission 6 to the power take-off shaft 10 than during normal operation. Preferably, the power take-off shaft clutch is engaged with a maximum of 20% of the nominal actuating force, so that no appreciable torque can be transferred to the power take-off shaft 10 via the clutch 12. As a result, the spline shaft profile of the power take-off shaft can be rotated to a slight extent virtually free of torque, the consequence of this being that the spline shaft connection between the power take-off shaft 10 and the input shaft of the additional assembly has relaxed and release of the spline shaft connection becomes possible.

The above-described operation presupposes visual detection of the relative rotary position of the power take-off shaft 10 with respect to the drive shaft of the additional assembly, which in the simplest case can be performed by the operator of the mobile working appliance 1. Optionally, however, it is also possible to arrange in the region of the power take-off shaft 10 and particularly of the spline shaft profile one or more sensors which detect an unfavorable rotary position of the power take-off shaft 10 with respect to the input shaft of the additional assembly and initiate rotary position correction virtually automatically without actuation of the front or rear button 24. Furthermore, the secondary drive device 2 according to the disclosure may optionally be provided with securing devices which prevent unintentional actuation of the front or rear button 24 from resulting in the execution of rotary position correction. For example, a sensor may be provided which detects the rotational speed of the engine 4 and outputs a rotary position correction enabling signal to the electronic control unit 14 only when this sensor detects an idling rotational speed of the engine 4. Furthermore, on the front or rear button 24, a further sensor may be arranged which measures the actuation time of the front or rear button 24 and from this detects actuation which may possibly be unintentional. For example, this sensor may be set such that a rotary position correction enabling signal is output by this sensor only when the front or rear button 24 is released again after a specific actuation time (for example, 100 ms). Said sensors of the securing device may be arranged selectively individually or in combination in the secondary drive device 2 according to the disclosure.

Basically, the secondary drive device 2 according to the disclosure can be used in all types of mobile working appliances and particularly in the agricultural sector.

A secondary drive device of a mobile working appliance with an electronic control unit 14 for actuating a power take-off shaft clutch 12 arranged between a transmission 6 and a power take-off shaft 10 is disclosed, according to the disclosure the control unit 14 being designed with a flange-mounting function unit which, when activated, executes a rotary position correction of the power take-off shaft 10 with respect to the drive shaft. Furthermore, a method for coupling and/or uncoupling a working machine to/from the secondary drive device 2 of a mobile working appliance 1 as an energy source is proposed, with the method steps:

leading a drive shaft of the working machine up to the end spline shaft profile of a power take-off shaft 10 of the secondary drive device 2, checking the relative rotary position of the power take-off shaft 10 with respect to the drive shaft of the working machine, and selectively triggering a flange-mounting function of the secondary drive device 2 as a function of the result of the check of the relative position for the electronically controlled rotary position correction of the power take-off shaft 10 with respect to the drive shaft.

LIST OF REFERENCE SYMBOLS

1 Mobile working appliance
2 Secondary drive device

4 Engine
6 Transmission
8 Rear wheels
10 Power take-off shaft
12 Power take-off shaft clutch
14 Control unit
16 Hydraulic system
18 Proportional pressure regulating valve
20 Clutch actuation device
22 Cab switch
24 Front or rear button

The invention claimed is:

1. A secondary drive device of a mobile working appliance comprising:
   a power take-off shaft;
   a transmission;
   a power take-off shaft clutch arranged between the transmission and the power take-off shaft; and
   an electronic control unit configured to operate the power take-off shaft clutch,
   wherein the control unit is configured with a flange-mounting function unit which, when activated, is configured to operate the power take-off shaft clutch in a mounting mode of operation to execute a rotary position correction, so that the power take-off shaft clutch engages the power take-off shaft only for a predetermined short time span to rotate the power take-off shaft.

2. The secondary drive device according to claim 1, wherein during activation of the flange-mounting function unit, the control unit is configured to rotate the power take-off shaft minimally and with a torque greatly restricted with respect to a nominal torque of the secondary drive device.

3. The secondary drive device according to claim 1, wherein, during the rotary position correction, the control unit is configured to rotate the power take-off shaft by an amount less than an angle between adjacent splines formed on the power take-off shaft.

4. The secondary drive device according to claim 1, further comprising:
   an external actuating switch operatively connected to the control unit and configured to activate the flange-mounting function unit.

5. The secondary drive device according to claim 1, wherein the control unit is configured, during the rotary position correction, to activate the power take-off shaft clutch with an actuating energy which amounts to a maximum of 20% of a nominal actuating energy.

6. The secondary drive device according to claim 1, further comprising:
   a sensor operatively connected to the control unit and configured to detect a rotational speed of an engine of the working appliance,
   wherein the flange-mounting function unit is configured to be activated only when the sensor transmits an idling signal to the control unit indicating that the engine is at an idling rotational speed.

7. The secondary drive device according to claim 1, wherein the control unit is configured with the flange-mounting function unit which, when activated, executes the rotary position correction of the power take-off shaft with respect to a drive shaft of an additional assembly.

8. The secondary drive device according to claim 1, wherein:
   the control unit is further configured with (i) a normal mode of operation, wherein the control unit is configured to operate the power take-off shaft clutch to rotate the power take-off shaft at a nominal torque, (ii) a disengaged mode of operation, wherein the control unit is configured to operate the power take-off shaft clutch to disengage from the power take-off shaft, and (iii) the mounting mode of operation, wherein the control unit is configured to operate the power take-off shaft clutch to rotate the power take-off shaft at a torque which is substantially less than the nominal torque.

9. A method for coupling and/or uncoupling a working machine to/from a secondary drive device of a mobile working appliance as an energy source, comprising:
   leading a drive shaft of the working machine up to an end spline shaft profile of a power take-off shaft of the secondary drive device;
   checking a relative rotary position of the power take-off shaft with respect to the drive shaft of the working machine; and
   selectively triggering a flange-mounting function of the secondary drive device as a function of the result of the check of the relative position to perform a rotary position correction to rotate the power take-off shaft with respect to the drive shaft.

10. The method according to claim 9, further comprising:
    detecting a rotational speed of an engine of the mobile working appliance, and
    permitting the triggering of the flange-mounting function only when the engine is detected as operating at an idling rotational speed.

11. The method according to claim 9, the triggering of the flange-mounting function further comprising:
    actuating a clutch between the power take-off shaft and an engine transmission of the working appliance with an actuating energy which is less than a nominal actuating energy of the clutch.

12. The method according to claim 11, wherein the actuation energy of the clutch is at most 20% of the nominal actuating energy.

13. The secondary drive device according to claim 9, wherein the flange-mounting function performs the rotary position correction to rotate the power take-off shaft by a predetermined angle with respect to the drive shaft.

14. The method according to claim 9, the rotary position correction comprising:
    engaging the power take-off shaft clutch with the power take-off shaft only for a predetermined short time span to rotate the power take-off shaft.

15. The method according to claim 14, wherein the power take-off shaft is configured to rotate with respect to the drive shaft by a predetermined angle during the rotary position correction.

16. A secondary drive device of a mobile working appliance comprising:
    a power take-off shaft;
    a transmission;
    a power take-off shaft clutch arranged between the transmission and the power take-off shaft; and
    an electronic control unit configured to operate the power take-off shaft clutch,
    wherein the control unit is configured with a flange-mounting function unit which, when activated, is configured to operate the power take-off shaft clutch in a mounting mode of operation to execute a rotary position correction, so that the power take-off shaft clutch briefly engages the power take-off shaft to rotate the power take-off shaft by a predetermined angle.

* * * * *